(No Model.)
J. H. THOMAS.
LAWN MOWER.
No. 375,842. Patented Jan. 3, 1888.
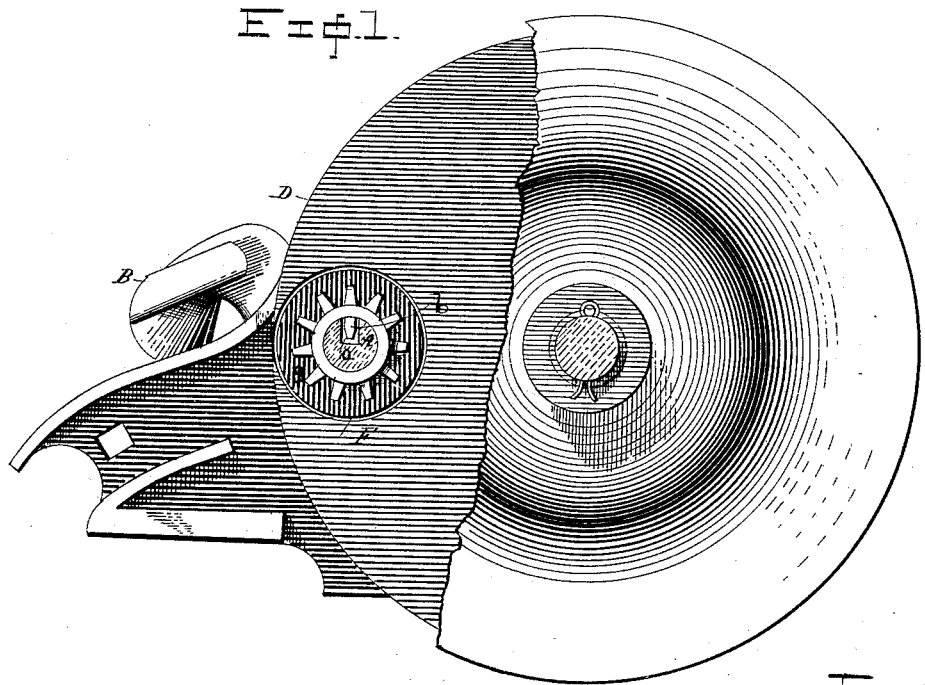
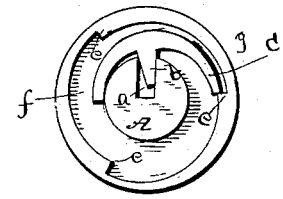
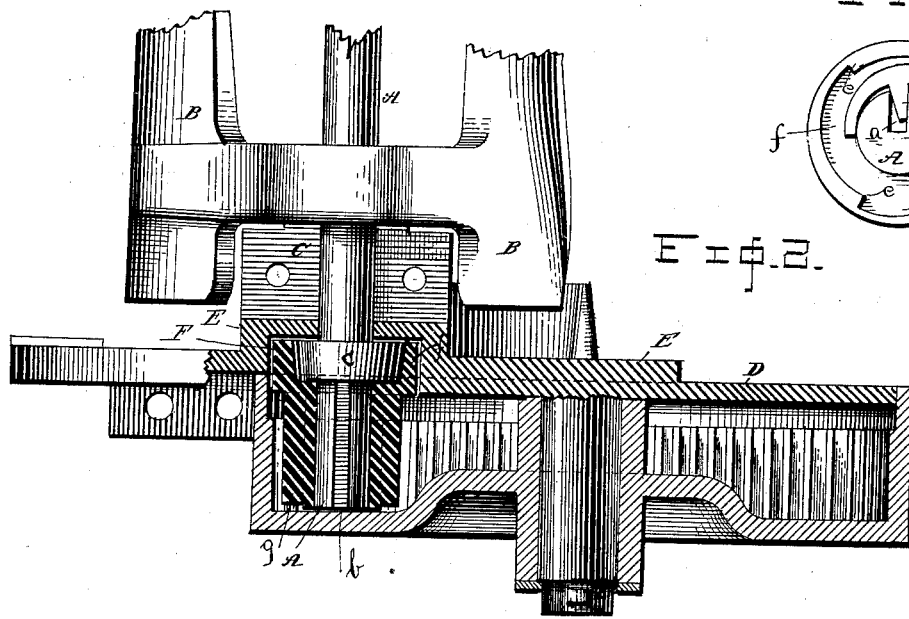
WITNESSES
INVENTOR

UNITED STATES PATENT OFFICE.

JOHN H. THOMAS, OF SPRINGFIELD, OHIO.

LAWN-MOWER.

SPECIFICATION forming part of Letters Patent No. 375,842, dated January 3, 1888.

Application filed February 21, 1887. Serial No. 228,387. (No model.)

*To all whom it may concern:*

Be it known that I, JOHN H. THOMAS, a citizen of the United States, residing at Springfield, in the county of Clark and State of Ohio, have invented certain new and useful Improvements in Lawn-Mowers, of which the following is a specification, reference being had therein to the accompanying drawings.

This invention relates to improvements in lawn-mowers, and in particular to a peculiar construction of a certain pinion used therein and of the side plates or heads of the mower-frame.

In lawn-mowers of the general class to which my invention relates there are side plates or heads to the frame of the machine, which form the inner faces of the ground-wheels, and over which these wheels extend at their peripheries, and over or round which they freely revolve. These plates also form bearings for the reel-shaft, the ends whereof project outward through the plates and into the chamber formed by the outer faces of the said wheels and by the said plates. These projecting ends of the reel-shaft each carry a pinion, which receives motion from the ground-wheel on that side of the machine, and then transmits that motion to the reel-shaft through a clutch.

For the purpose of economy in constructing these lawn-mowers it is desirable to employ but two cutter-bars to the reel, and consequently but two cutters. To do this, however, and yet avoid any reduction in the working capacity of the machine when it reaches the user, it is necessary to increase the speed of rotation of the cutters, and therefore of the reel. To accomplish this end the pinions already alluded to, which heretofore have been of the same diameter at the clutch and toothed ends, are to be reduced in diameter; but this reduction does not leave metal enough in them to insure their withstanding the strains incident to usage at that part with which the clutches engage. It is to provide for reducing the pinions in diameter where their teeth occur and to still preserve an ample diameter at their clutch ends, and also to provide a seat or recess, into which this larger diameter of the pinions may extend, so as to be out of the same vertical plane as that in which the ground-wheels rotate, that my invention is designed.

To this end my invention consists, essentially, in providing a seat or recess in the side plates around the reel-shaft bearings, of sufficient depth and diameter to accommodate the clutch portion of the pinions, and in constructing the pinions with a small tooth-diameter and a larger clutch portion arranged to enter the said seat, as will be hereinafter more particularly pointed out.

In the accompanying drawings, forming a part of this specification, and on which like reference-letters indicate corresponding features, Figure 1 represents a side view of a portion of a lawn-mower with my improvements embodied therein, and with a part of the ground-wheel broken away; Fig. 2, a horizontal sectional view of the same; and Fig. 3, an end view of the clutch end of the pinion and of the reel-shaft, showing also the clutch.

The letter A designates a portion of a reel-shaft of the usual kind, having the cutter-bars B, of which, however, there are but two. This shaft has a bearing in the box C of the side plate, D, the lower half of said box being cast therewith and the upper half secured in any approved manner. The said side plate is cast with a recess, which forms the boss E on the side away from the ground-wheel, while on the side next to that wheel the seat or pinion-recess is formed, as seen at F. The boss is the result of the recess, and of course in thick side plates the recess may be cast, if preferred, without the formation of a boss, while the recess is of sufficient depth to accommodate and receive the clutch end of the pinion, so as to leave projecting outside of the plate and into the ground-wheel only the toothed portion of the pinion. The relative position of these parts is clearly shown in Fig. 2. The reel shaft is grooved out at *a*, and the pawl *b* engages the groove, while the flukes *c* thereof act in conjunction with the shoulders or teeth *e* in the interior of the clutch end *f* of the pinion *g*, all as more fully described and shown in Letters Patent issued to Frank M. Waters, October 19, 1886, No. 351,009, for clutch mechanism, and assigned to me. While this is the preferred form of clutch, it is obvious that the success of the reduced pinion, and the enlarged and strengthened clutch end of the pinion incased by the end plate and out of the reach of the ground-wheel does not depend upon this particular clutch.

From the statements hereinbefore made it will be seen that by this simple and effective construction I increase the speed of the cutters, and hence the facility with which they cut, preserve the strength of the clutch end of the pinion, and leave only the toothed portion of the pinion projecting into the ground-wheel, and yet lose nothing of the stability of the machine generally, while reducing its cost by omitting all cutters over two in number.

Of course, if my improvements were used in a machine with more than two cutters, it would still be within the purview of my invention, yet I design it to be used specially with two cutters. The clutch end of the pinion does not fit closely, but merely operates within the pinion-seat, so as to be out of the way of the ground-wheel.

Having thus fully described my invention, what I claim as new, and desire to secure by Letters Patent, is—

1. In a lawn-mower, the combination, with the reel-shaft and the side plate constructed with a pinion-seat in the outer side thereof, of a pinion of two diameters, the smaller being the tooth portion and the larger the clutch portion, mounted on said shaft, with the larger portion fitted into said seat, and the ground-wheel meshing with the teeth of the pinion.

2. In a lawn-mower, the combination, with the side plate having a boss projecting from the inner side thereof, and a pinion-seat in said plate, and extending into said boss from the outer side of the plate, of a pinion having two diameters, the larger being the clutch end, fitted into said seat, and the reel-shaft on which the pinion is mounted.

In testimony whereof I affix my signature in presence of two witnesses.

JOHN H. THOMAS.

Witnesses:
M. J. STOLL,
THOS. P. FETTER.